(No Model.)
R. D. MERSHON.
ROTARY TRANSFORMER REGULATION.
No. 571,863. Patented Nov. 24, 1896.
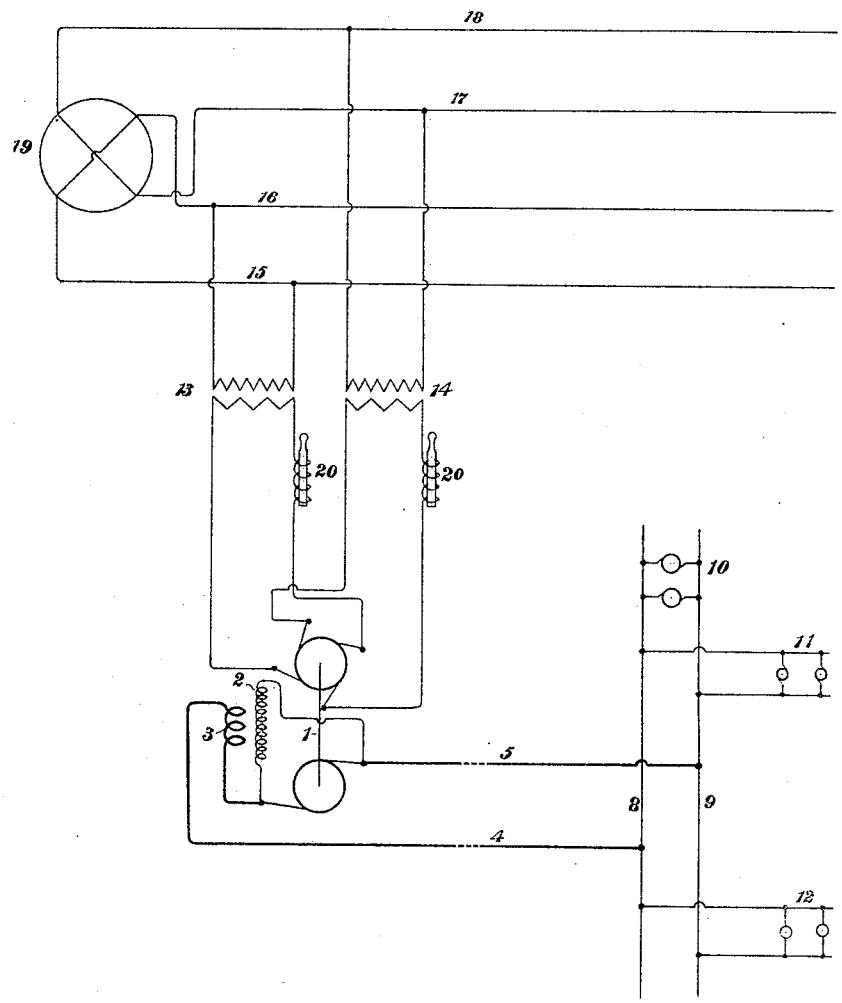
WITNESSES:
INVENTOR
R. D. Mershon
BY
H. G. Carr
ATTORNEY.
THE NORRIS PETERS CO., PHOTO-LITHO., WASHINGTON, D. C.

UNITED STATES PATENT OFFICE.

RALPH D. MERSHON, OF PITTSBURG, PENNSYLVANIA.

ROTARY-TRANSFORMER REGULATION.

SPECIFICATION forming part of Letters Patent No. 571,863, dated November 24, 1896.

Application filed April 6, 1896. Serial No. 586,288. (No model.)

*To all whom it may concern:*

Be it known that I, RALPH D. MERSHON, a citizen of the United States, residing in Pittsburg, in the county of Allegheny and State of Pennsylvania, have invented a new and useful Improvement in Rotary-Transformer Regulation, (Case No. 687,) of which the following is a specification.

My invention relates to systems of electrical distribution in which rotary transformers are employed for transforming electric alternating currents into direct currents for use in operating translating devices; and it has for its object to provide a means for and method of automatic regulation whereby the electromotive force delivered to the direct-current circuit will be automatically adjusted in accordance with changes in the load upon such circuit, so as to give an approximately constant electromotive force or an increasing electromotive force either at the terminals of the machine or at the load end of the circuit.

As the voltage at the direct-current end of a rotary transformer always bears a definite fixed relation to that at the alternating-current end, it is necessary to provide some means for raising the voltage supplied to the latter with the increase of load upon the direct-current circuit in order to compound or overcompound the transformer, and thus secure an approximately constant or increasing electromotive force either at its direct terminals or at the load end of its circuit under varying loads.

In carrying out my invention I employ a transformer the armature of which may have either one or a plurality of windings, as may be desired, and the field-magnet of which is provided with both shunt and series coils. In the alternating-current circuit supplying the transformer I introduce inductive resistance, the amount of which will depend upon the degree of compounding or overcompounding which is desired. By properly proportioning the resistance of the shunt-circuit the field charge for the condition of no-load may be made such that the current supplied to the transformer will be either leading, lagging, or in step with the electromotive force. For the purposes of my invention, however, the field charge will preferably be so adjusted that there will be a lagging current through the armature-coils at no-load. As the load comes on the series coil will strengthen the field of the machine, and thus reduce the lagging component, and consequently the drop of voltage in the alternating-current circuit due to the inductive resistance, until finally all of the current supplied to the transformer will be in step with the electromotive force at its terminals. When this condition is attained, there will still be some drop in electromotive force between the source of current and the terminals of the rotary transformer; but if the field of the transformer continues to strengthen by reason of the increase of current through its series coils there will be added to the current flowing through the transformer a component in advance of the electromotive force at the transformer-terminals, and this will still further decrease the drop in voltage due to the inductive resistance included in the circuit between the source of current and the transformer, until the electromotive force supplied to the transformer is approximately equal to that of the source of current. If the load is increased beyond this point, the electromotive force supplied to the transformer may remain approximately equal to that of the source of current or may fall below or rise above it, according to the relative adjustment of the inductive resistance and the transformer field-magnet coils. In most cases, however, it is preferable in obtaining this regulating action for constant or increasing electromotive force at the direct-current terminals throughout the range of load to have such an adjustment of the inductive resistances that the series coils will at full-load cause the electromotive force at the terminals of the transformer to be about equal to that of the source. Such equality may, however, by proper adjustment be made to come at any point between zero and full-load.

The accompanying drawing is a diagram of a system of distribution illustrative of my invention, in which—

1 is a rotary transformer, the armature of which may have one or two windings, as may be desired.

2 represents the shunt field-magnet winding, and 3 the series field-magnet winding, and 4 and 5 direct-current feeders supplying mains 8 and 9. Translating devices receiving current from said mains are shown at 10, 11, and 12. Any other desired arrangement of translating devices and circuits may obviously be employed.

13 and 14 are stationary step-down transformers or converters, the primaries of which are respectively connected with the circuits 15 and 16 and 17 and 18, supplied with current from a two-phase generator 19.

It will be understood that in cases where the generator potential is not too high the rotary transformer may be supplied directly therefrom without the interposition of step-down converters. In each alternating-current circuit supplied by the secondaries of the converters 13 and 14 or by the generator directly, as the case may be, is a choke-coil 20. These coils may, if desired, however, be included in the circuit supplying the primaries of the converters 13 and 14, and in some cases such converters may themselves include sufficient inductive resistance to provide the necessary difference of potential between the generator and the transformer. The transformer field-magnet windings and the inductive resistance represented by the choke-coils 20 will be adjusted for each particular organization of apparatus; but when once adjusted for any special case they have a constant value.

I have illustrated the invention as applied to a two-phase system of distribution, but it will be understood that it is equally applicable to single-phase systems or to those having a greater number of phases than two. Where choke-coils are employed, as will usually be necessary in order to secure the desired inductive potential drop, they will be so proportioned that there will be no saturation of their cores under any conditions. As the inductive drop due to the choke-coils is diminished by the strengthening of the field under an increase of load and the current is brought more nearly into step with the electromotive force impressed upon the circuit by the generator 19, the effective electromotive force supplied by the rotary transformer to the direct-current circuit will be kept up to the desired value.

The inductive resistance and the field-coils of the transformer may be made so that the current and electromotive force will be brought into step under any desired conditions of load depending upon the conditions of the plant in connection with which the invention is employed and the results sought to be secured thereby.

I claim as my invention—

1. The method of controlling the electromotive force delivered from the direct-current end of a rotary transformer in accordance with changes in load, which consists in compounding the field of such transformer and establishing a difference of voltage between the same and the generator, which difference decreases as the load upon the direct-current side increases.

2. The method of controlling the electromotive force delivered from the direct-current end of a rotary transformer in accordance with changes in load which consists in compounding the field of such transformer and establishing in the alternating-current circuit an inductive counter electromotive force the effect of which in reducing the line electromotive force decreases as the load on the direct-current circuit increases.

3. The method of regulating a rotary transformer in accordance with changes in load on the direct-current circuit, which consists in compounding the field of such transformer and establishing a counter electromotive force between the same and the generator, the effective component of which counter electromotive force decreases as the load on the direct-current circuit increases.

4. A system of electrical distribution comprising a source of alternating currents, its circuit, a rotary transformer having a compound-wound field-magnet, and an inductive resistance in said alternating-current circuit of such value that the desired electromotive force at the direct-current terminals may be automatically secured.

5. The combination with an alternating-current circuit provided with an inductive resistance, of a rotary transformer receiving current from such circuit and having a compound-wound field-magnet whereby the desired electromotive force upon the direct-current circuit will be secured.

In testimony whereof I have hereunto subscribed my name this 1st day of April, A. D. 1896.

RALPH D. MERSHON.

Witnesses:
WESLEY G. CARR,
HUBERT C. TENER.